United States Patent
LeCocq et al.

(10) Patent No.: US 10,054,703 B2
(45) Date of Patent: Aug. 21, 2018

(54) METHOD OF IMAGING THE SUBSURFACE USING STACKED SEISMIC DATA FROM AZIMUTHALLY VARYING VELOCITY AND AMPLITUDE INFORMATION

(75) Inventors: Paul LeCocq, West Ealing (FR); Cyrille Reiser, Woking (FR); John Brittan, Weybridge (GB)

(73) Assignee: PGS Geophysical AS, Oslo (NO)

(*) Notice: Subject to any disclaimer, the term of this patent is extended or adjusted under 35 U.S.C. 154(b) by 548 days.

(21) Appl. No.: 12/661,727

(22) Filed: Mar. 23, 2010

(65) Prior Publication Data

US 2011/0238315 A1    Sep. 29, 2011

(51) Int. Cl.
*G01V 1/30* (2006.01)

(52) U.S. Cl.
CPC .................. *G01V 1/301* (2013.01)

(58) Field of Classification Search
CPC ........................................ G01V 1/301
USPC ........................................... 702/16
See application file for complete search history.

(56) References Cited

U.S. PATENT DOCUMENTS

| | | | |
|---|---|---|---|
| 5,508,973 A | 4/1996 | Mallick et al. | |
| 6,654,693 B2 | 11/2003 | Sen et al. | |
| 6,889,142 B2 | 5/2005 | Schonewille | |
| 6,985,405 B2 | 1/2006 | Ren et al. | |
| 7,460,437 B2 | 12/2008 | Sicking et al. | |
| 2003/0167126 A1* | 9/2003 | Horne et al. | 702/14 |
| 2004/0093163 A1 | 5/2004 | Reshef et al. | |
| 2008/0109168 A1* | 5/2008 | Koren et al. | 702/16 |

FOREIGN PATENT DOCUMENTS

GB    2 359 364    8/2011

OTHER PUBLICATIONS

Thomas, Judith, European Search Report, Completion Date of Search: Jul. 19, 2011.
Charles Sicking et al., "3D Azimuthal Imaging", SEG Ann. Mtg., Tech. Abstr., p. 2364-2367, San Antonio, 2007.
H. Tabti, T. Tvedt, J. Langhammer, "Azimuthal Dependent Processing Application to the Clair OBS Data", EAGE 66th Conference & Exhibition, (2004), p. 308, Paris, France.

* cited by examiner

*Primary Examiner* — Manuel A Rivera Vargas

(57) ABSTRACT

Fast anisotropy axis values are determined for each bin in seismic data binned by azimuth. A fast azimuth gather is determined within each bin in the seismic data from the fast anisotropy axis values. The earth's subsurface is imaged, using the fast azimuth gathers.

14 Claims, 3 Drawing Sheets

METHOD OF IMAGING THE SUBSURFACE USING STACKED SEISMIC DATA FROM AZIMUTHALLY VARYING VELOCITY AND AMPLITUDE INFORMATION

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of imaging azimuthally-varying seismic data.

2. Description of the Related Art

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The resulting seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle acceleration sensors or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been utilized that contain water particle velocity sensors such as geophones or particle acceleration sensors such as accelerometers, in addition to hydrophones. The pressure sensors and particle motion sensors are typically deployed in close proximity, collocated in pairs or pairs of arrays along a seismic cable.

Seismic data are often acquired with variation in the source to receiver azimuth. Processing the seismic data needs to be able to account for both the azimuthal variation in the data acquisition and the azimuthal variation in the earth's properties in order to bring about the desired result, an accurate image of the earth's subsurface.

Thus, a need exists for a method for imaging the earth's subsurface from azimuthally varying seismic data. In particular, a need exists for a method for imaging the earth's subsurface using stacked seismic data from azimuthally varying velocity and amplitude information.

BRIEF SUMMARY OF THE INVENTION

The invention is a method for imaging the earth's subsurface. In one embodiment, a programmable computer is used to perform the following. Fast anisotropy axis values are determined for each bin in seismic data binned by azimuth. A fast azimuth gather is determined within each bin in the seismic data from the fast anisotropy axis values. The earth's subsurface is imaged, using the fast azimuth gathers.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for imaging earth's subsurface from azimuthally-varying seismic data. The information generated by velocity based or amplitude based processing that computes the fast anisotropy axis for each individual azimuthal bins in the seismic data is used to produce a fast axis stack for each bin. The information can be an ASCII file or other convenient format containing the fast angle values for each bin, for a given horizon or ensemble of horizons. This information can be then used in a Fourier reconstruction process to generate the specific fast azimuth gather within each individual bin, hence allowing the production of angle gathers and all possible stacks and AVO products.

Figure 1:
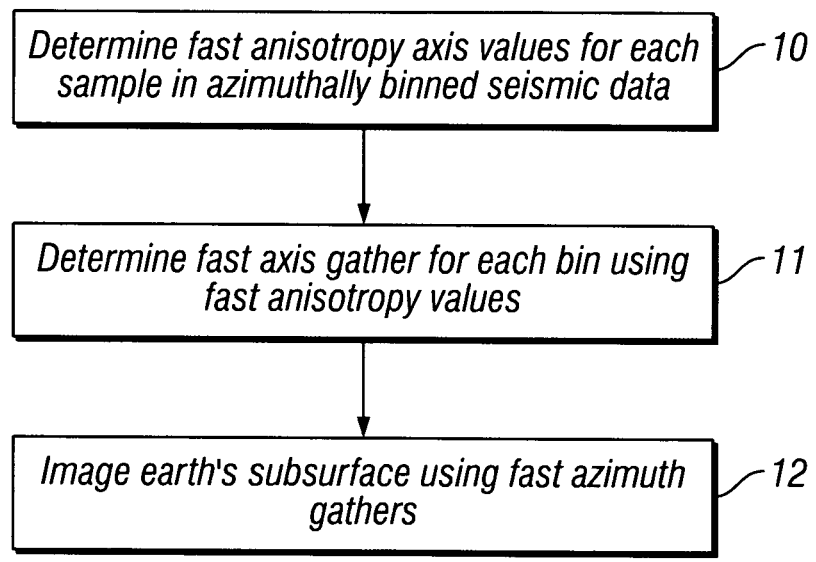
FIG. 1 is a flowchart illustrating an embodiment of the invention for imaging the earth's subsurface from azimuthally varying seismic data.

FIG. 1 is a flowchart illustrating an embodiment of the invention for imaging the earth's subsurface from azimuthally varying seismic data.

At block 10, fast anisotropy axis values are determined for each sample in seismic data binned by azimuth;

At block 11, a fast axis gather is determined within each bin in the seismic data from the fast anisotropy axis values from block 10; and At block 12, earth's subsurface is imaged, using the fast azimuth gathers from block 11.

Figure 2:
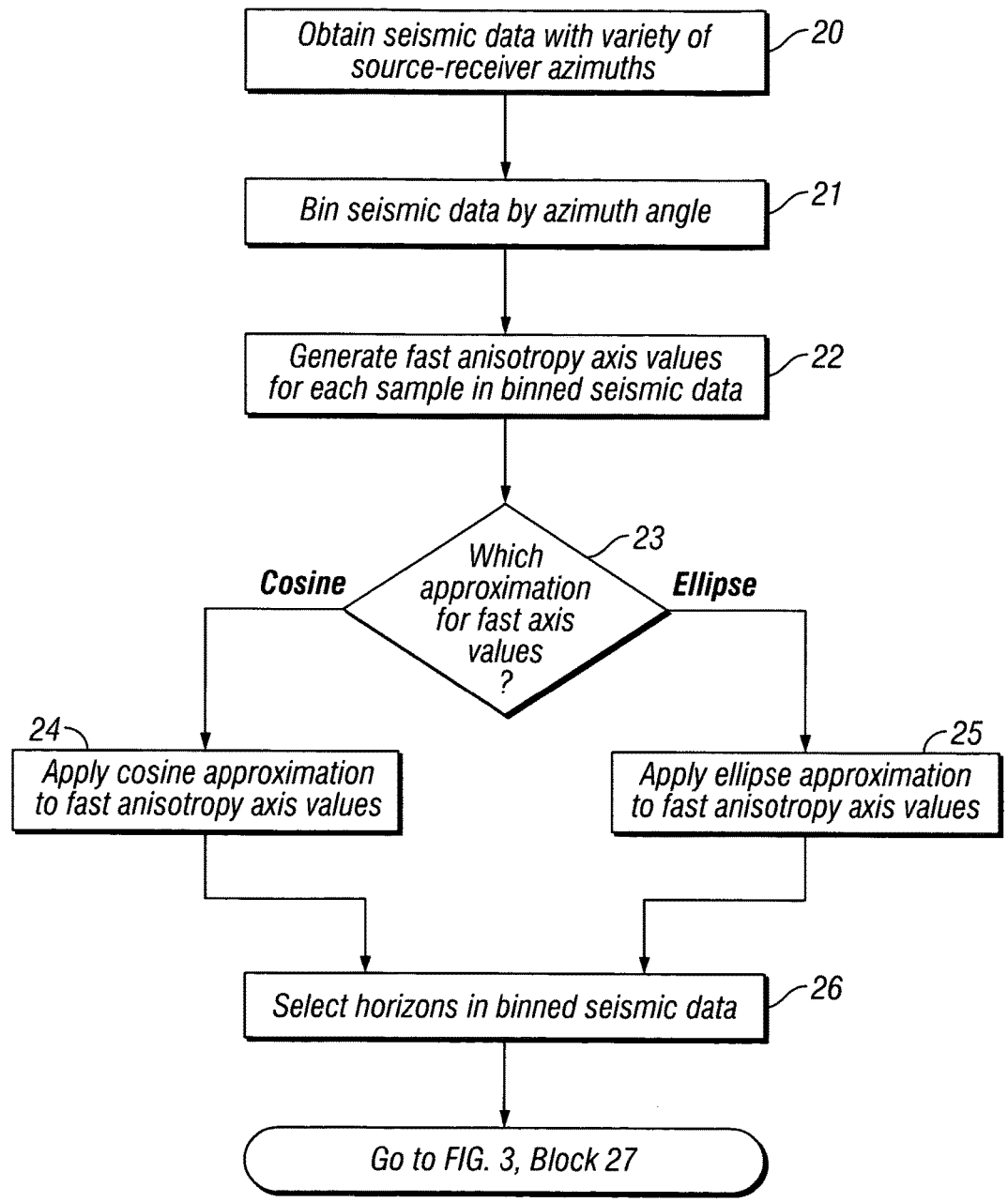
FIG. 2 is a flowchart illustrating an initial portion of a second embodiment of the invention for imaging the earth's subsurface from azimuthally varying seismic data.

FIG. 2 is a flowchart illustrating an initial portion of a second embodiment of the invention for imaging the earth's subsurface from azimuthally varying seismic data. FIG. 2 illustrates a more detailed embodiment of the invention than shown in FIG. 1.

At block 20, seismic data with a variety of source-receiver azimuths are obtained. The seismic data are obtained from land or marine seismic data acquisition.

At block 21, the seismic data obtained in block 20 are binned by azimuth angle into different azimuth sectors.

At block 22, seismic processing is applied to the seismic data binned in block 21. In one embodiment, the seismic processing applied is velocity based analysis, which generates velocity values that vary with azimuth. In another embodiment, the seismic processing applied is amplitude based analysis, which generates amplitude values that vary with azimuth. In yet another embodiment, the seismic processing applied is a combination of velocity and amplitude analysis, generating both velocity and amplitude values. In any embodiment, the seismic processing yields fast anisotropy axis values for each of the samples in the azimuth bins in the binned seismic data.

In the following discussion, the invention will be described in terms of velocities, in particular, NMO velocities. This choice of analysis values will be for illustrative purposes only, and is not to be considered a restriction on the invention.

3-D NMO velocities may vary with azimuth due to structure, heterogeneity, and anisotropy. For a plane layer model with arbitrary dips at any azimuth, an NMO velocity function can be expressed as an ellipse by analytic formulas. The velocity ellipse function for the azimuth dependent NMO velocity $V_{NMO}(\theta)$ is given by:

$$V_{NMO}(\theta)^2 = v_f^2 \cos(\theta-\phi)^2 + v_s^2 \cos(\theta-\phi)^2, \quad (1)$$

where $\theta$ is the azimuth angle, $v_f$ is the fast anisotropy velocity, $v_s$ is the slow anisotropy velocity, and $\phi$ is the azimuth angle along the long axis of the velocity ellipse. The fast velocity $v_f$ and slow velocity $v_s$ make up the long and short axes, respectively, of the velocity ellipse function. Thus, $\phi$ is the azimuth along the long axis corresponding to $v_f$.

There are two approaches that are commonly used to approximate the azimuth dependent NMO velocity function. The first approach approximates the velocity ellipse function in Equation (1) using a cosine function. The cosine approximation is given by:

$$V_{NMO}(\theta) \approx \frac{v_f + v_s}{2} + (v_f - v_s)\frac{\cos[2(\theta-\phi)]}{2} \quad (2)$$

The second approach approximates the velocity ellipse function in Equation (1) using an ellipse function, by means of a least-squares fitting. The ellipse approximation is given by:

$$\frac{1}{V_{NMO}(\theta)^2} \approx \frac{\cos(\theta-\phi+90)^2}{v_s^2} + \frac{\sin(\theta-\phi+90)^2}{v_f^2} \quad (3)$$

Since the velocity approximations given in Equations (2) and (3) have three unknowns, at least three velocity data sets are required to generate the velocity ellipse approximations. The more velocity files that are input, the better the velocity functions will be fitted to the ellipses.

At block 23, it is decided which approximation, the cosine approximation of Equation (2) or the ellipse approximation of Equation (3), is to be applied to the processed seismic data from block 22 to fit the data to the ellipse-like function of Equation (1) that approximates the azimuth dependent NMO velocity function. If it is decided to use the cosine approximation, then the process proceeds to block 24. If it is decide to use the ellipse approximation, then the process proceeds to block 25.

At block 24, the cosine approximation of Equation (2) is applied to the binned seismic data from block 22. Then the process proceeds to block 26.

At block 25, the ellipse approximation of Equation (3) is applied to the binned seismic data from block 22.

At block 26, a horizon or a series of horizons is selected in the binned seismic data from block 22. The azimuth based stacking will be based upon these horizons. Next the process continues to block 27 of FIG. 3.

Figure 3:
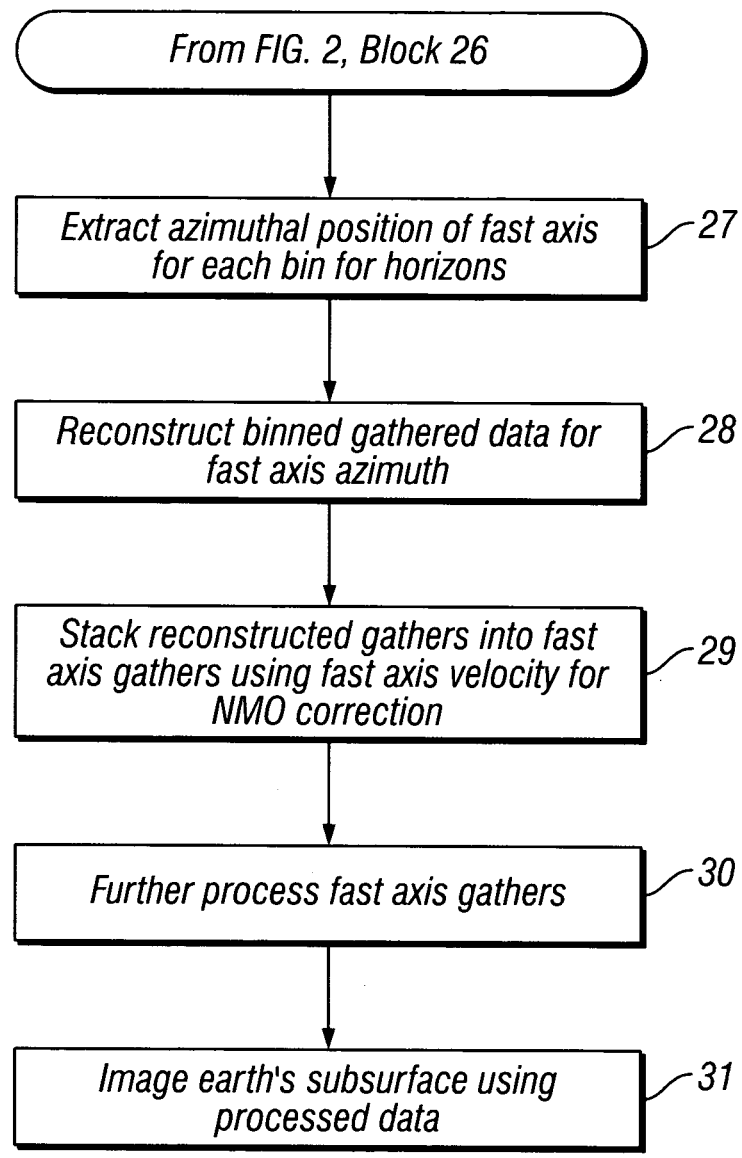
FIG. 3 is a flowchart illustrating a final portion of a second embodiment of the invention for imaging the earth's subsurface from azimuthally varying seismic data, begun in FIG. 2.

FIG. 3 is a flowchart illustrating a final portion of a second embodiment of the invention for imaging the earth's subsurface from azimuthally varying seismic data, begun in FIG. 2. First, the process continues from block 26 of FIG. 2.

At block 27, the azimuthal position of the fast axis is extracted for each bin, using the horizons selected in block 26.

At block 28, the binned gathered data from blocks 24 or 25, with regular sampling in offset-x and offset-y, are reconstructed, generating gathers with regular sampling in offset for each bin, for the fast axis azimuth. In one embodiment, this reconstruction is accomplished by Fourier Regularization, such as, for example, using an anti-alias, anti-leakage Fourier transform.

At block 29, the reconstructed regular offset gathers from block 28 are NMO corrected using the fast axis velocity $v_f$ and stacked into a fast axis gather.

At block 30, the fast axis gathers from block 29 are further processed. For example, the AVO attributes along this fast axis may be now be easily calculated and analysed.

At block 31, the processed data from block 30 are used to image the earth's subsurface.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for imaging earth's subsurface, comprising:
using a programmable computer to perform the following:
obtaining seismic data with a variety of source-receiver azimuth angles;
determining fast anisotropy axis values for each sample in seismic data binned by the azimuth angles;
determining a fast azimuth gather within each bin in the seismic data from the fast anisotropy axis values; and
imaging the earth's subsurface, using the fast azimuth gathers.

2. The method of claim 1, wherein the determining fast anisotropy axis values comprises:
binning the seismic data by azimuth angle into different azimuth sectors; and
applying seismic processing to the seismic data, generating fast anisotropy axis values for each sample in the binned seismic data.

3. The method of claim 2, wherein the determining a fast azimuth gather comprises:
applying an approximation to the binned seismic data;
selecting horizons in the binned seismic data;
extracting the azimuthal position of the fast axis for each bin, using tile horizons;
reconstructing the binned gathered data into regular offset gathers for the fast axis values; and
stacking the regular offset gathers using the fast axis velocity for normal moveout correction, generating fast axis gathers.

4. The method of claim 3, wherein the approximation comprises a cosine approximation.

5. The method of claim 3, wherein the approximation comprises an ellipse approximation.

6. The method of claim 3, wherein the reconstruction comprises Fourier Regularization.

7. The method of claim 3, wherein the imaging the earth's subsurface comprises:
further processing the fast axis gathers; and
using the processed data to image the earth's subsurface.

8. A non-transitory computer readable medium with a computer program stored thereon, the program having logic operable to cause a programmable computer to perform steps comprising:
obtaining seismic data with a variety of source-receiver azimuth angles;
determining fast anisotropy axis values for each sample in seismic data binned by the azimuth angles;
determining a fast azimuth gather within each bin in the seismic data from the fast anisotropy axis values; and
imaging the earth's subsurface using the fast azimuth gathers.

9. The medium of claim 8, wherein the determining fast anisotropy axis values comprises:
binning the seismic data by azimuth angle into different azimuth sectors; and applying seismic processing to the seismic data, generating fast anisotropy axis values for each sample in the binned seismic data.

10. The medium of claim 9, wherein the determining a fast azimuth gather comprises:
applying an approximation to the binned seismic data;
selecting horizons in the binned seismic data;
extracting the azimuthal position of the fast axis for each bin, using the horizons;
reconstructing the binned gathered data into regular offset gathers for the fast axis values; and
stacking the regular offset gathers using the fast axis velocity for normal moveout correction, generating fast axis gathers.

11. The medium of claim 10, wherein the approximation comprises a cosine approximation.

12. The medium of claim 10, wherein the approximation comprises an ellipse approximation.

13. The medium of claim 10, wherein the reconstruction comprises Fourier Regularization.

14. The medium of claim 10, wherein the imaging the earth's subsurface comprises:
further processing the fast axis gathers; and
using the processed data to image the earth's subsurface.

* * * * *